US012110474B2

(12) United States Patent
Kim

(10) Patent No.: US 12,110,474 B2
(45) Date of Patent: Oct. 8, 2024

(54) NATURAL WAX COMPOSITION

(71) Applicant: Hae Ju Kim, Seoul (KR)

(72) Inventor: Hae Ju Kim, Seoul (KR)

( * ) Notice: Subject to any disclaimer, the term of this patent is extended or adjusted under 35 U.S.C. 154(b) by 81 days.

(21) Appl. No.: 17/606,467

(22) PCT Filed: May 8, 2019

(86) PCT No.: PCT/KR2019/005485
§ 371 (c)(1),
(2) Date: Oct. 26, 2021

(87) PCT Pub. No.: WO2020/222344
PCT Pub. Date: Nov. 5, 2020

(65) Prior Publication Data

US 2022/0195333 A1 Jun. 23, 2022

(30) Foreign Application Priority Data

Apr. 30, 2019 (KR) ........................ 10-2019-0050443

(51) Int. Cl.
*C11C 5/00* (2006.01)

(52) U.S. Cl.
CPC .............. *C11C 5/002* (2013.01); *C11C 5/004* (2013.01)

(58) Field of Classification Search
CPC .......... C11C 5/002; C11C 5/004; C11C 5/008
See application file for complete search history.

(56) References Cited

U.S. PATENT DOCUMENTS

| | | | | | |
|---|---|---|---|---|---|
| 6,063,144 | A * | 5/2000 | Calzada | C11C 5/002 | 431/126 |
| 2003/0140551 | A1 | 7/2003 | Noda et al. | | |
| 2003/0236387 | A1* | 12/2003 | Pavlin | A61K 8/88 | 528/272 |
| 2004/0250464 | A1* | 12/2004 | Rasmussen | C11C 5/006 | 44/275 |
| 2008/0307696 | A1* | 12/2008 | Wu | C11C 5/002 | 44/275 |
| 2014/0230314 | A1 | 8/2014 | Murphy et al. | | |

FOREIGN PATENT DOCUMENTS

| | | | |
|---|---|---|---|
| JP | 2003-213293 | A | 7/2003 |
| KR | 10-2010-0098019 | A | 9/2010 |
| KR | 10-2013-0034159 | A | 4/2013 |
| KR | 10-1754370 | B1 | 7/2017 |
| KR | 10-2019-0002983 | A | 1/2019 |

OTHER PUBLICATIONS

International Search Report for PCT/KR2019/005485 mailed Jan. 23, 2020 from Korean Intellectual Property Office.

* cited by examiner

*Primary Examiner* — Vishal V Vasisth
(74) *Attorney, Agent, or Firm* — Revolution IP, PLLC

(57) ABSTRACT

Proposed is a natural wax composition including 80 to 95 parts by weight of natural plant oil being a mixture of different kinds of oil, 3 to 20 parts by weight of wax, and 1 to 3 parts by weight of a preservative. Therefore, a natural wax composition can be provided that enables anyone to easily and conveniently mold Do-it-Yourself (DIY) scented candles even without the need for any expert knowledge for making scented candles. The natural wax composition can exhibit cream-type properties, leading to a reduction in liquefaction time compared to solid wax, thereby significantly reducing the manufacturing time of scented candles.

5 Claims, No Drawings

NATURAL WAX COMPOSITION

This application is a 371 of PCT/KR2019/005485, filed May 8, 2019.

TECHNICAL FIELD

The present disclosure relates to a natural wax composition and, more particularly, to a natural wax composition obtained through the blending of natural ingredients to exhibit soft cream-type properties, thereby enabling the ease of manufacture of scented candles without needing to be melted for the mixture with various fragrances.

BACKGROUND ART

A typical candle is manufactured by melting a combustible solid material such as paraffin at a certain temperature, placing a wick in a mold, and pouring the molten combustible material into the mold to shape a candle. The candle thus manufactured can be used for illumination by lighting the wick. As the wick burns, the heat of the flame melts the combustible solid material around the wick.

Candles have been used for various purposes, such as for lighting in houses and stores, etc. during a power outage, or for decoration to create an atmosphere at various banquets and event halls, and are being manufactured in various shapes of a cylinder, a quadrangle, and a polygon.

As the quality of life has been improved recently due to increases in income levels, various types of candles are being manufactured using natural ingredients such as soybean oil, coconut oil, etc. In particular, scented candles that create an atmosphere by generating flames and emitting a scent at the same time during burning have been manufactured and marketed and are gaining increasing attention. For this reasons, many studies are being conducted in related fields.

As an example, Korean Patent Application Publication No. 10-2013-0034159 of Document 1 discloses a description of a method for manufacturing a soy candle using soy wax.

As another example, Korean Patent Application Publication No. 10-2010-0098019 of Document 2 discloses a description of a method for manufacturing an eco-friendly candle using natural edible oil obtained from coconut, palm, cotton, corn, or soybeans, etc.

However, because such conventional scented candles use a wax composition in a solid form such as paraffin, etc., the melting point of the wax composition is high, resulting in an increased manufacturing time. Also, expert knowledge for the manufacture of scented candles is required.

DISCLOSURE

Technical Problem

Accordingly, the present disclosure has been made keeping in mind the above problems occurring in the related art, and an objective of the present disclosure is to provide a natural wax composition that enables anyone to easily and conveniently mold Do-it-Yourself (DIY) scented candles without the need for any expert knowledge for making scented candles.

Another objective of the present disclosure is to provide a natural wax composition capable of exhibiting cream-type properties, leading to a reduction in liquefaction time compared to solid wax, thereby significantly reducing the manufacturing time of scented candles.

Another objective of the present disclosure is to provide a natural wax composition capable of manufacturing scented candles having a high scent throw.

Technical Solution

In order to accomplish the above objectives, the present disclosure provides a natural wax composition including: 80 to 95 parts by weight of natural vegetable oil being a mixture of different kinds of oil; 3 to 20 parts by weight of wax; and 1 to 3 parts by weight of a preservative.

Here, the natural vegetable oil may be prepared by mixing two kinds of oil selected from among palm oil, sunflower oil, grape seed oil, and canola oil.

Furthermore, in the natural vegetable oil, the two kinds of selected oil may be mixed in a ratio of 5:5 to 7:3.

Here, the wax may be any one or a mixture of at least two selected from among candelilla wax, beeswax, paraffin wax, palm wax, and soy wax.

Here, the preservative may be any one selected from among vitamin E and propolis.

On the other hand, the natural wax may further include 0.2 to 1 part by weight of a natural dye or synthetic dye for obtainment of a specific color.

Here, the natural dye may be prepared using any one or a mixture of at least two selected from among glutinous millet, indigo plant, and marigold.

Advantageous Effects

The present disclosure can provide a natural wax composition that enables anyone to easily and conveniently mold Do-it-Yourself (DIY) scented candles without the need for any expert knowledge for making scented candles. The natural wax composition can exhibit cream-type properties, leading to a reduction in liquefaction time compared to solid wax, thereby significantly reducing the manufacturing time of scented candles. Furthermore, scented candles having a high scent throw can be manufactured.

BEST MODE

Hereinafter, the configuration of the present disclosure will be described in detail.

In the following description of the present disclosure, detailed descriptions of known functions and components incorporated herein will be omitted when it may make the subject matter of the present disclosure unclear. All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, it is to be noted that the weight and experimental conditions of each composition presented below are only the numerical value and conditions for the most preferred embodiment of the present disclosure, but are not limited to the numerical value and conditions, and can be freely changed within the weight ratio range of each component presented in the claims.

Therefore, the descriptions of the embodiment of the present disclosure disclosed herein are only for illustrative purposes of the preferred embodiment of the present disclosure, and the present description is not intended to represent all of the technical spirit of the present disclosure. The scope of the present disclosure should be defined by the following claims and their equivalents.

A natural wax composition according to the present disclosure includes 80 to 95 parts by weight of natural vegetable oil being a mixture of different kinds of oil; 3 to 20 parts by weight of wax; and 1 to 3 parts by weight of a preservative.

Here, when the amount of the natural vegetable oil is less than 80 parts by weight or exceeds 95 parts by weight, it is difficult to achieve soft cream-type properties. On the other hand, when the amount of wax is less than 3 parts by weight or exceeds 20 parts by weight, it is difficult to control the hardness of the wax.

Here, the natural vegetable oil may be prepared by mixing two kinds of oil selected from among palm oil, sunflower oil, grape seed oil, and canola oil. In the natural vegetable oil, the two kinds of selected oil may be mixed in a ratio of 5:5 to 7:3.

For example, the natural vegetable oil may be prepared by mixing 70 parts by weight of palm oil and 30 parts by weight of sunflower oil. Other vegetable oils such as grape seed oil, canola oil, etc. may be used in place of the sunflower oil.

Here, the wax may be any one or a mixture of at least two selected from among candelilla wax, beeswax, paraffin wax, palm wax, and soy wax, preferably a mixture of 80 parts by weight of candelilla wax and 20 parts by weight of beeswax, and more preferably a single candelilla wax.

Here, the preservative may be any one selected from among vitamin E and propolis, and is preferably an extract of vitamin E.

On the other hand, the natural wax composition prepared in the above-described manner may further include 0.2 to 1 part by weight of a natural dye or synthetic dye for obtainment of a specific color. When the amount of the natural dye or synthetic dye is less than 0.2 part by weight or exceeds 1 part by weight, it is difficult to obtain a desired color, and it takes a long period of time.

Here, the natural dye may be prepared using any one or a mixture of at least two selected from among glutinous millet, indigo plant, and marigold. For example, glutinous millet may be added to obtain red-based colors, indigo plant may be added to obtain blue-based colors, and marigold may be added to obtain yellow-based colors. Natural dyes extracted from such as green bamboo, persimmon, gardenia, etc. may be used to add more colors, or conventional natural dyes may be used instead. The amount of added natural dyes may be adjusted depending on the depth of color.

In addition, more colors may be created by mixing the obtained colors by adding the above-described natural dyes in various formulations.

The synthetic dye may be prepared using paraffin refined oil. As the paraffin refined oil, a kind of paraffin refined oil with a desired color may be selected from among various product groups having 10 to 15 different colors and used. Alternatively, a mixture of various kinds of paraffin refined oil may be used to create a desired color.

As described above, the present disclosure can provide the natural wax composition that enables anyone to easily and conveniently mold Do-it-Yourself (DIY) scented candles without the need for any expert knowledge for making scented candles. The natural wax composition can exhibit cream-type properties, leading to a reduction in liquefaction time compared to solid wax, thereby significantly reducing the manufacturing time of scented candles. Furthermore, scented candles having a high scent throw can be manufactured.

MODE FOR INVENTION

A natural wax composition according to the present disclosure exhibits soft cream-type properties, is made of natural materials and thus is free from harmful substances, and allows, due to the cream-type properties, a user to make a scented candle only by adding and mixing fragrances (fragrance oil, pure essential oil, etc.) with the wax composition without the need for melting the wax composition. This enables anyone to make DIY scented candles easily and conveniently without the need for any expert knowledge for making scented candles.

In addition, compared to a case where scented candle experts use conventional solid wax to make a high-quality scented candle, since the cream-type wax composition has a low melting point than the solid wax and is already in soft cream form, it melts to liquid form in a shorter time. This significantly reduces the time to add fragrance and color and also reduces the time for the wax composition to return to liquid form, thereby significantly reducing the manufacturing time of scented candles.

In addition, the cream-type wax composition may be formed in a form of a decorative candle or decorative scented candle by using it with the conventional solid wax. For example, the decorative candle or decorative scented candle may be formed by applying the cream-type wax composition on a candle or scented candle made of the conventional solid wax in a manner such as decorating whipped cream flowers on a cake.

In addition, in the case of the cream-type wax composition, the fragrance flash point is lower compared to the conventional solid wax, leading to an increase in burn time. Also, fragrance may be added at a lower temperature, so loss of fragrance may be reduced even in a primary manufacturing process, thereby making it possible to make a scented candle with a high scent throw. The fragrance may be added in an amount of 12% to 15% higher than 7% to 11%, which corresponds to the amount of natural wax that can be added, so it is possible to manufacture a scented candle with a high scent throw.

Since the wax composition according to the present disclosure exhibits the cream-type properties, the scent diffusion time is much faster compared to the conventional solid wax. Therefore, unlike conventional soy wax or paraffin palm wax which have to be kept lit for at least 1 hour to smell a scent, a scent may be quickly diffused within about 20 minutes. Also, the diffusion power is much stronger compared to the conventional solid wax, so a deep and rich scent may be produced. In the case of conventional soy wax, the fragrance flash point is lower compared to paraffin wax and thus the burn time is slightly longer. The burn time of the cream-type wax composition is 1.5 to 2 times larger than that of such soy wax, although it may vary depending on environmental conditions.

In addition, conventional natural waxes are used more frequently than paraffin wax because they are made of natural ingredients, but the major drawback of these natural waxes is that they have less scent throw than paraffin wax. However, the cream-type wax composition is a natural wax and has a better scent throw than scented candles made of paraffin wax, so it can be used with confidence and can reproduce the scent throw of paraffin wax. This means that the cream-type wax composition has all the benefits of both the natural waxes and the paraffin wax.

The cream-type wax composition may be adjusted in hardness. The hardness of the cream-type wax composition may be adjusted for various uses, including candle wax, wax for therapeutic therapy such as a paraffin bath, etc., so the cream-type wax composition is broadly applicable beyond candles and scented candles.

The cream-type wax composition enables even DIY scented candle consumers, including scented candle experts, to make scented candles easily and conveniently with natural raw ingredients at reasonable prices, and to make scented candles with an even burn, a long burn time, and a rich scent throw without the need for any expert knowledge. In addition, a scented candle made of the cream-type wax composition may be used by easily filling various containers, and after use, it may refill the container for re-use, so the utility thereof is high.

The invention claimed is:

1. A natural cream-type wax composition consisting of:

80 to 95 parts by weight of natural vegetable oil being a mixture of different kinds of oil;

3 to 20 parts by weight of wax;

1 to 3 parts by weight of a preservative, wherein the preservative is any one selected from among vitamin E and propolis; and 0.2 to 1 part by weight of a natural dye or synthetic dye for obtainment of a specific color, wherein the natural cream-type was composition is in a cream form.

2. The natural cream-type wax composition of claim 1, wherein the natural vegetable oil is prepared by mixing two kinds of oil selected from among palm oil, sunflower oil, grape seed oil, and canola oil.

3. The natural cream-type wax composition of claim 2, wherein in the natural vegetable oil, the two kinds of selected oil are mixed in a ratio of 5:5 to 7:3.

4. The natural cream-type wax composition of claim 1, wherein the wax is any one or a mixture of at least two selected from among candelilla wax, beeswax, paraffin wax, palm wax, and soy wax.

5. The natural cream-type wax composition of claim 1, wherein the natural dye is prepared using any one or a mixture of at least two selected from among glutinous millet, indigo plant, and marigold.

* * * * *